Jan. 30, 1940. J. HALTENBERGER 2,188,891
AUTOMOBILE HOOD
Filed April 28, 1938 2 Sheets-Sheet 1
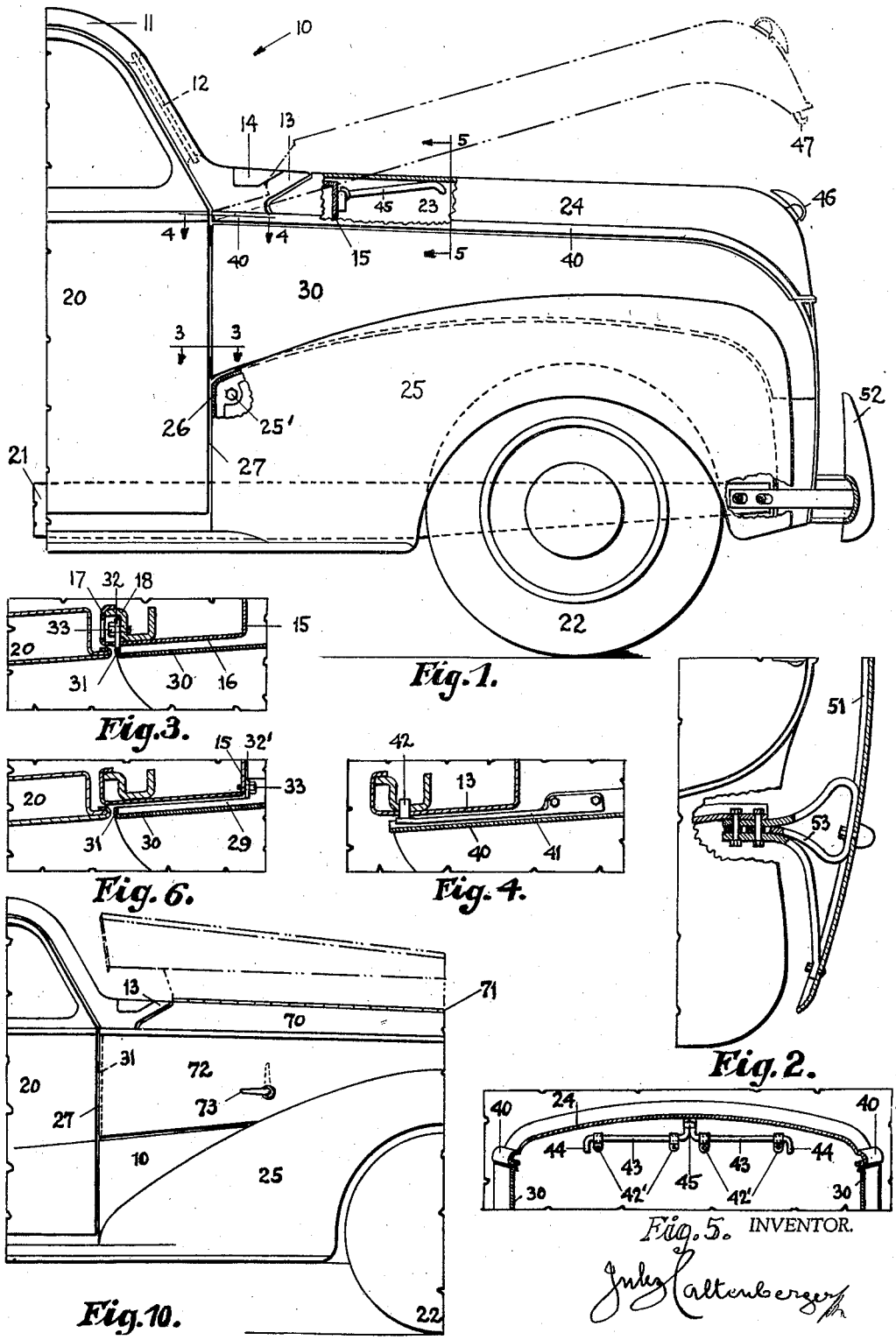

Jan. 30, 1940.   J. HALTENBERGER   2,188,891
AUTOMOBILE HOOD
Filed April 28, 1938   2 Sheets-Sheet 2

INVENTOR.
Jules Haltenberger

Patented Jan. 30, 1940

2,188,891

UNITED STATES PATENT OFFICE 2,188,891

AUTOMOBILE HOOD

Jules Haltenberger, Ann Arbor, Mich.

Application April 28, 1938, Serial No. 204,717

15 Claims. (Cl. 180—69)

My invention relates to automobile hood construction and more especially when related to an independent frame supported body and hood.

It has been proposed to hinge a complete hood on a transverse central hinge at the base of a usual windshield. It is here proposed to hinge a hood at its extreme width while maintaining a usual ventilator shelf and ventilator in its usual place.

It has been also proposed to provide an automobile hood with hinge-mounted hood side walls reaching the front door edge. It is here proposed to use a demountable fender as the major visible part of the hood, and by an integral lateral wall connected hood side wall as the minor visible part, and in the preferred form to use this unit for the formation of the front door front gap.

A further object is to provide narrow demountable hood side walls in direct spacing to the front edge of the front doors.

A further object is to provide a torsional spring to assist the opening of the hood and to hold the hood while in opened position. Further objects of my invention will appear as the description proceeds.

Figure 7:
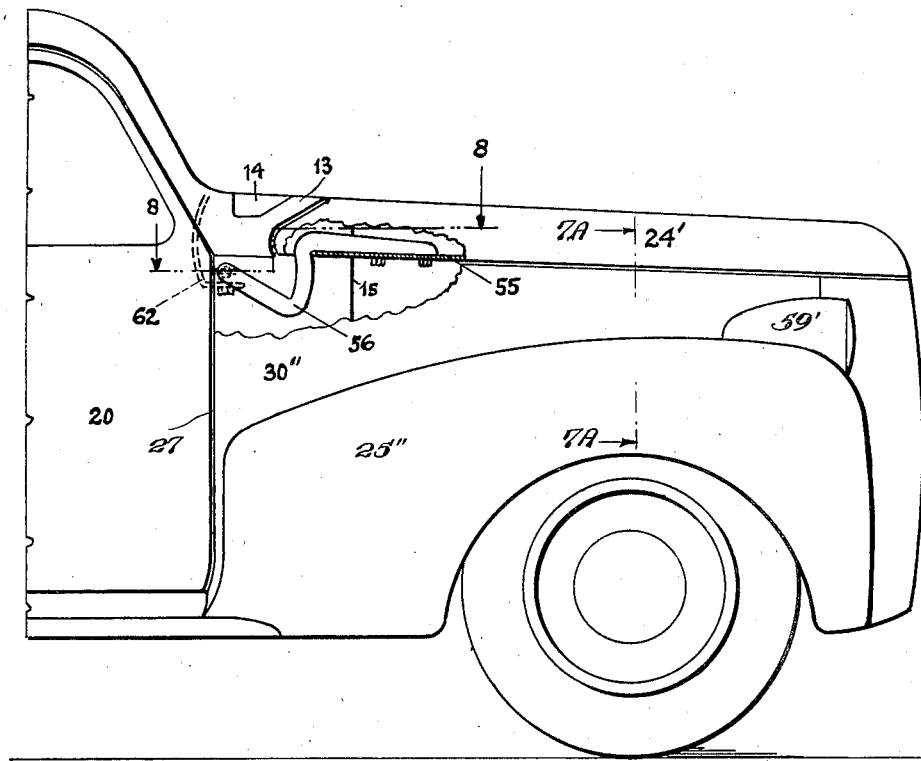
Figure 8:
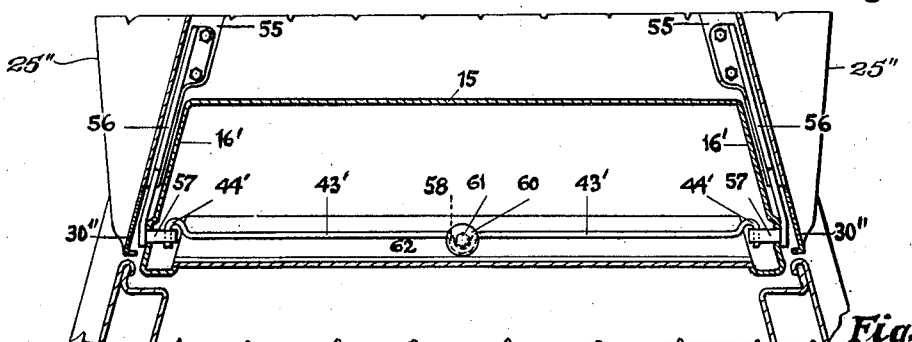
Figures 7A, 9:
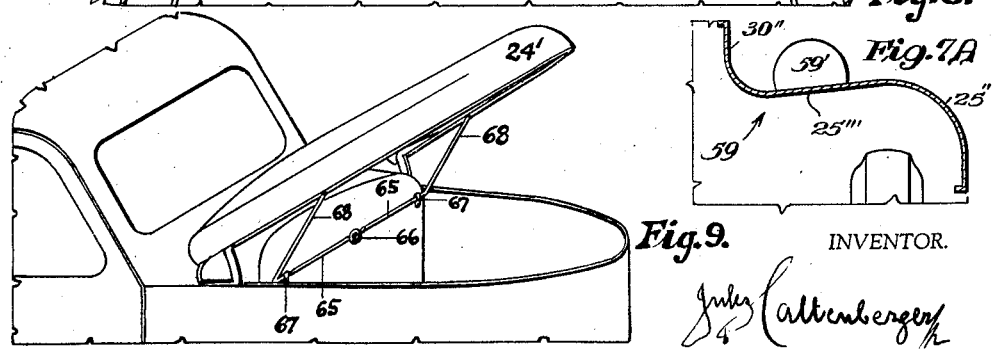

The accompanying drawings illustrate my invention. Here Fig. 1 is a side elevation of the fore part of an automobile; Fig. 2 is a plan view of the extreme fore part of an automobile illustrated in Fig. 1; Fig. 3 is a horizontal transverse section substantially on lines 3—3 of Fig. 1; Fig. 4 is a substantially horizontal transverse section on lines 4—4 of Fig. 1; Fig. 5 is a vertical transverse section substantially on lines 5—5 of Fig. 1, here illustrated on a somewhat smaller scale; Fig. 6 is a modification of the invention illustrated in Fig. 3; Fig. 7 is a modification of the invention illustrated in Fig. 1; Fig. 7a is a vertical section substantially on lines 7A—7A of Fig. 7; Fig. 8 is a substantially horizontal section on lines 8—8 of Fig. 7; Fig. 9 is an isometric view of a hood held in open position; Fig. 10 is a modification of the invention illustrated in Fig. 1.

Referring to Figs. 1 to 5 inclusive, it will be seen that an automobile body generally at 10 is provided with a roof 11, windshield 12, ventilator shelf 13 surrounding a usual ventilator 14 and forwardly terminating in a usual dash board 15, the front face of a usual cowl.

As is clear from Fig. 3, the dash board at each side (only one is shown) is formed into a rearwardly extending cowl side wall 16, terminating at the rear in a door ledge 17 arranged to be braced by a usual door pillar 18.

Ventilator shelf 13, dash board 15 and cowl side walls 16 form a usual automobile body bowl; it will be noted however that here cowl side walls 16 are entirely hidden from sight (to be described).

The body 10 is provided with a front door 20 and the body is arranged to be supported by a separate frame 21 and wheels 22 (only one is shown) in the usual manner.

In front of the dash board 15, a usual engine chamber 23 is provided. This chamber is covered by a U shaped alligator hood 24. The lower part of the side of this chamber is masked by a fender 25 secured at the rear to body as by capscrew 25' (front fender support might be of any known design) and with its rear vertical wall 26 positioned to form the lower half of a usual narrow parallel door gap 27 when so desired.

Above the fender lateral inner edge and below the alligator hood, a stationary and easily demountable hood side wall 30 is positioned; here its rear vertical end is formed into a vertical wall 31 and is arranged to form the upper half of the usual door gap 27. As is clear from Fig. 3, it is secured to the rear end of the cowl as by one or more lips 32 passing through the wall 16 through suitable openings and arranged to rest on the rear wall of door pillar 18 and to be secured as by cap screws 33 (the front support of 30 wall 30 might be any of the known designs).

It will be noted that by extending the hood side wall 30 to the rear of the ventilator shelf 13 and up to the door and thereby forming the door gap, the expense of the body construction is reduced. Here but two surfaces need to be in horizontal and vertical alignment to form a smooth body exterior; further, the existence of a single narrow parallel gap increases the hood side wall length and correspondingly increases the optical aspect of the length of the automobile (a feature desired by the buying public) at no expense.

Alligator hood 24 is provided at each side with a hollow bead 40. As is clear from Fig. 1, this bead passes rearwardly at the side of the ventilator shelf 13 and extends up to the door gap 27. As is clear from Fig. 4, a hinge-lag 41 is bolted to the lower edge of bead 40 and is provided at its rear end with an integral trunnion 42 operatively mounted in a hole in the side wall of ventilator shelf 13 and door pillar 18 respectively.

This alligator hood mounting is simple and inexpensive. To assist in the opening of the hood 24 and to hold the hood in open position, as illustrated by a chain line in Fig. 1, the dash board 15, as is clear from Fig. 5, is provided with four clamps 42' operatively supporting an integral torsional spring having horizontal members 43, vertical reaction members 44 and forwardly extending operative member 45, the forward part of which is in contact with the under wall of hood 24. It is important to note that the torsional spring is formed and tempered to assure a hood lifting torsional stress in horizontal members 43 when in the position illustrated in Figs. 1 and 5 and this stress should be sufficient to hold the hood in open position. The locking of the hood in closed position is effected by a turnable lock handle 46 and hook 47 respectively and this lock mechanism might be of any of the known designs.

The above described torsion spring mechanism is inexpensive, silent, assists in lifting the hood and holds the hood in open position.

Figs. 1 and 2 illustrate a conventional bumper 51 and relatively high bumper guards 52 (only one is shown). To prevent the guard from inward bending when colliding at the top part, I provide a bumper iron 53 in a suitable slide on frame 21 and provide it with elongated holes as a yielding feature for direct collision. This subject matter will be presented in a separate application.

Fig. 6 illustrates a modification of the securing means of the hood side wall 30 to the cowl. Here wall 30 is provided with a flange 30', part of which is bent up to form a lip 32' to be secured to dash board 15 (a part of the cowl) as by cap screw 33.

Figs. 7 and 8 illustrate a modification of the alligator hood hinge and it is more particularly for the constructions where the body bead is omitted.

Here alligator hood 24' is provided with an inturned flange 55 arranged to support bent hinge-legs 56 terminating at the rear in upwardly slanting portions carrying trunnions 57 operatively mounted in cowl side walls 16'. An associated pair of legs 56 serve as the sole hinge means for the hood.

It is important to note that legs 56 are assembled on the body before the mounting of removable hood side walls 30'. After the legs are in place, they are bolted to the alligator hood.

To assist the opening of the hood and to hold the hood in open position, a torsion spring is provided which is substantially in concentric relation to the trunnions 57 and has integral horizontal members 43' and trunnion engaging end members 44'. Midway of the horizontal members, a semi-circular portion 58, washer 60 and bolt 61 serve as the anchoring means to secure the center of the torsion spring to the bottom flange of a usual instrument board 62.

Figs. 7, 7A and 8 also illustrate a modification of the fender and hood side wall construction. Here a fender 25'' has a substantially horizontal (lateral) wall 25''' terminating in a substantially vertical hood side wall 30'' thereby forming a strengthened one piece unit 59 free of flat vibrating areas. This unit construction reduces costs of manufacturing, aligning, and mounting. In the preferred form unit 59 forms the door gap 27. It is important that this unit should be demountably secured in its position (as by bolts or capscrews, generally described in connection with Figs. 1, 3 and 6). A demountable mounting of this unit firmly connects the automobile front end with the cowl, prevents fender and lamp (59') vibrations, and does permit the quick removal of this unit (and usual mud wall (not shown)) for valve adjustment and repairs.

It will be noted that the alligator hood hinge mountings illustrated in Figs. 1 and 3 and also in Figs. 7 and 8 are substantially in continuation of the vertical outside members of the U shaped hood, thereby permitting the use of a light gauge metal. Further, the hinge mountings do not interfere with the instruments and their wirings on the dash board; nor do they interfere with the size and location of the usual glove compartment.

In Figs. 1 and 5, the torsion spring lifts the hood by a central lever. For certain applications, I prefer to reverse the process and lift the hood by two levers (one under each in-turned flange of the hood) and anchor the center of the spring; this is illustrated in Fig. 9.

Here the integral torsion spring is formed of horizontal members 65, central anchoring at 66, brackets 67 and operating levers 68.

In Figs. 1, 7 and 8 demountable narrow hood side walls and high fenders are illustrated in association with a one piece alligator hood. Obviously the benefits of this construction will be unaltered when in association with a two piece longitudinally hinged hood. Also in Figs. 7 and 8 the demountable narrow hood side wall and high fender unit forms the usual front door gap, for certain applications (as an example when it is desired to postpone the initial die cost investment) I might prefer to terminate this unit at a short distance from the door gap; as long as the fender and wall form an integral demountable unit to strengthen the car construction and provide engine accessibility when temporarily desired (not shown).

It is important to note that as shown in Figs. 1 and 7 the crown of the fender is near horizontal thereby assuring a long vertical contact area with the cowl for wide securing bolt spacing (only one shown) thereby making the fender a functional front supporting element.

The extension of the hood side wall up to the door is not limited to alligator hoods. It might be connected to a lengthwise centrally hinged hood. One application is illustrated in Fig. 10 in connection with the design of one of the largest producers on the American Continent.

Here hood half 70 operates on hinge 71 and integral therewith is hood side wall 72, which is rearwardly extended up to the door 20. This hood half is arranged to be locked by the operation of the usual handle 73.

In this patent application, the wording of "single hinge" shall mean a single fulcrum at each rear corner of the hood, resulting in two fulcrum points per hood, this in contrast to the usual different length double linkages at each corner now in use. Double linkages need at least eight fulcrum points per hood; they are expensive and inefficient, "alligator" shall mean any form of hood construction arranged, to be transversely hinged on the automobile body.

What applicant claims as his invention:

1. In an automobile, a body having front doors and forwardly terminating in a cowl, a ventilator shelf formed at the top of said cowl and a ventilator therein, normally stationary hood side walls terminating adjacent to said doors and secured to said cowl, an alligator hood normally in continuation of said shelf and above said walls on said automobile, single hinge means for said hood at substantially the extreme sides of said cowl and masked by said walls, and means to assist the opening of said hood including a torsion spring.

2. In an automobile, a body having front doors and forwardly terminating in a cowl, a ventilator shelf formed at the top of said cowl and a ventilator therein, normally stationary hood side walls terminating adjacent to said doors and secured to said cowl, an alligator hood normally in continuation of said shelf and above said walls on said automobile, single hinge means for said hood at substantially the extreme sides of said cowl, and means to assist the opening of said hood including a torsion spring.

3. In an automobile, a body having front doors and forwardly terminating in a cowl, a shelf formed at the top of said cowl, normally stationary hood side walls terminating adjacent to said doors and secured to said cowl, an alligator hood normally in continuation of said shelf and above said walls on said automobile, and single hinge means for said hood at substantially the extreme sides of said cowl.

4. In an automobile, a body having a cowl, a ventilator shelf formed at the top of said cowl and a ventilator therein, an alligator hood having substantially horizontal and vertical walls normally in continuation of said shelf, single hinge means substantially in continuation of said vertical walls and fulcrumed on said cowl, and means to secure said hood in closed position.

5. The invention described in claim 4 wherein the single hinge means include normally upwardly slanting rear portions.

6. In an automobile, a body having a cowl, an engine chamber in front of said cowl, an alligator hood having substantially horizontal and vertical walls over said chamber, a pair of materially extending hinge-legs on said hood substantially in continuation of said vertical walls, deep pockets substantially at the extreme width of said cowl for the reception of said hinge-legs, and fulcrum means on said legs connecting said legs to said cowl.

7. The invention described in claim 6 wherein the hinge-legs include normally upwardly slanting rear portions.

8. In an automobile having a windshield, side doors with their forward edges adjacent said windshield, a cowl compartment forward of said windshield and doors, and an engine chamber forward of said cowl compartment: cowl, hood and fender construction characterized by its lengthening effect and the minimizing of matched surfaces, comprising a cowl structure having side portions and having an exterior upper surface portion, demountable stationary hood side walls at their rear end portions overlapping said cowl side portions and terminating at the forward edges of said doors, and fender portions being a lateral continuation of said hood side walls and at their rear ends having portions which overlap said cowl side portions, below said rear end portions of said hood side walls, upper hinged hood structure being a continuation of said cowl exterior upper surface and constituting an upper enclosure for said engine chamber, and means for removably securing said hood side walls and fenders to said cowl structure.

9. The invention described in claim 8 wherein the hood side wall and the fender are formed of separate parts.

10. The invention described in claim 8 wherein the upper hinged hood structure is an alligator hood.

11. The invention described in claim 8 wherein fender portions terminate at the forward edge of the doors.

12. In an automobile having a windshield, side doors with their forward edges adjacent said windshield, a cowl compartment forward of said windshield and doors, and an engine chamber forward of said cowl compartment: cowl, hood and fender construction, comprising a cowl structure having side portions and having an upper surface portion, demountable stationary hood side walls having their rear end portions overlapping said cowl side portions, and fenders being an integral part of and lateral continuation of said hood side walls and at their rear ends having portions which overlap said cowl side portions, upper hinged hood structure being a continuation of said cowl upper surface and constituting an upper enclosure for said engine chamber, and means for removably securing said hood side wall and fender units to said cowl structure.

13. The invention described in claim 12 wherein the rear end of the hood side wall and fender units terminate at the forward edges of the doors.

14. The invention described in claim 12 wherein the upper hinged hood structure is an alligator hood.

15. In an automobile having a windshield, side doors, a cowl compartment forward of said windshield and doors, and an engine chamber forward of said cowl compartment: cowl, hood and fender construction, comprising a cowl structure having an upper surface portion and side portions, demountable stationary fenders each having a near horizontal crown masking the major part of said engine chamber and their rear end portions overlapping said cowl side portions, hood side walls being integral with and a lateral continuation of said fenders and forming the minor part of said engine chamber and at their rear end portions overlapping said cowl side portions, upper hinged hood structure constituting an upper enclosure for said engine chamber, and removable means for demountably securing said hood side walls and fenders to said cowl structure.

JULES HALTENBERGER.

DISCLAIMER 2,188,891.—*Jules Haltenberger*, Ann Arbor, Mich. AUTOMOBILE HOOD. Patent dated January 30, 1940. Disclaimer filed October 24, 1941, by the patentee.

Hereby enters this disclaimer to claim 12, except as modified by claim 13, which depends upon claim 12, and to claims 14 and 15.

[*Official Gazette November 18, 1941.*]